US007039044B1

(12) United States Patent
Whitfield et al.

(10) Patent No.: US 7,039,044 B1
(45) Date of Patent: May 2, 2006

(54) METHOD AND APPARATUS FOR EARLY DETECTION OF DTMF SIGNALS IN VOICE TRANSMISSIONS OVER AN IP NETWORK

(75) Inventors: Michael C. Whitfield, Valbome (FR); Michael J. Simpson, Rancho Santa Margarita, CA (US); Remy P. Gauguey, Le Cannet (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/418,397

(22) Filed: Oct. 14, 1999

(51) Int. Cl.
*H04L 12/66* (2006.01)
(52) U.S. Cl. ........................................ 370/356; 370/428
(58) Field of Classification Search ................ 370/352, 370/353, 356, 428
See application file for complete search history.

(56) References Cited

U.S. PATENT DOCUMENTS

| | | | |
|---|---|---|---|
| 5,542,112 A * | 7/1996 | Alonso et al. ............... 455/466 |
| 5,666,357 A | 9/1997 | Jangi ........................... 370/345 |
| 5,694,466 A * | 12/1997 | Xie et al. .................... 379/386 |
| 5,818,929 A * | 10/1998 | Yaguchi ...................... 379/418 |
| 6,031,903 A * | 2/2000 | Partridge, III ......... 379/201.01 |
| 6,141,341 A * | 10/2000 | Jones et al. .................. 370/352 |
| 6,298,055 B1 * | 10/2001 | Wildfeuer .................... 370/352 |
| 6,330,311 B1 * | 12/2001 | Mijares et al. ......... 379/112.01 |
| 6,385,192 B1 * | 5/2002 | Kozdon et al. ............. 370/352 |
| 6,385,202 B1 * | 5/2002 | Katseff et al. .............. 370/401 |
| 6,400,709 B1 * | 6/2002 | Yousseff ..................... 370/352 |
| 6,650,662 B1 * | 11/2003 | Arnaud et al. ............... 370/526 |
| 6,757,276 B1 * | 6/2004 | Harper et al. ................ 370/356 |
| 6,757,367 B1 * | 6/2004 | Nicol ....................... 379/90.01 |

(Continued)

FOREIGN PATENT DOCUMENTS

EP  746170 A2 * 12/1996

(Continued)

OTHER PUBLICATIONS

Shatnawi, A.M. et al. "A Digital Receiver for Dual Tone Multifrequency (DTMF) Signals". IEEE Instrumentation and Measurement Technology Conference, 1997. May 19-21, 1997. vol. 2. pp. 997-1002.*

(Continued)

*Primary Examiner*—John Pezzlo
*Assistant Examiner*—Donald L Mills
(74) *Attorney, Agent, or Firm*—Farjami & Farjami LLP

(57) ABSTRACT

A method and apparatus for early detection of in-band DTMF signals in voice transmissions over an IP network are disclosed. Using a digital signal processor, whenever any indication of signals possibly corresponding to the signals characteristic of DTMF tones are detected, packets of data that would otherwise be sent over the IP network are delayed and temporarily stored in a buffer. Buffering the data packets provides a period of time for digital signal processing techniques to reliably determine whether the characteristics of the detected signal are sufficient to characterize it as a DTMF signal. If a determination is made that the signal has the necessary characteristics of a valid DTMF signal, the buffered packets are discarded and a special control packet is sent formatted to convey to the recipient characteristic information for the detected DTMF signal sufficient to allow the DTMF signal to be generated by a DTMF generator. If a determination is made that the signal does not have the necessary characteristics of a valid DTMF signal, the buffered packets are transmitted. The disclosed method and apparatus is effective to remove DTMF signals from RTP packet transmissions, and to replace the DTMF signals with RTP control packets.

81 Claims, 9 Drawing Sheets

U.S. PATENT DOCUMENTS 6,775,265 B1 * 8/2004 Oran .......................... 370/352

FOREIGN PATENT DOCUMENTS

| EP | 946034 A2 | 9/1999 |
| WO | WO94/11983 | 11/1993 |
| WO | WO96/32817 | 4/1996 |
| WO | WO 9725822 A1 * | 7/1997 |
| WO | WO00/05905 | 7/1999 |

OTHER PUBLICATIONS

Hao, Jiang et al. "In-band Tone Signal Coding in the Low-Bit-Rate Speech Vocoder". International Conference on Communication Technology Proceedings, 1998. Oct. 22-24, 1998. vol. 2. pp. 1-4.*

* cited by examiner

METHOD AND APPARATUS FOR EARLY DETECTION OF DTMF SIGNALS IN VOICE TRANSMISSIONS OVER AN IP NETWORK

BACKGROUND OF THE INVENTION

1. Technical Field

The present invention relates, generally, to the transmission of voice in the form of digital packets of data sent over a network using an internet protocol and, more particularly, to the removal of digitized audio representative of DTMF signals from packets to be sent over an IP network, and replacing such signals with special control packets containing information sufficient to characterize the detected DTMF signal.

2. Background Art and Technical Problems

Telephone communications have, in the past, typically involved voice signals transmitted over the public switch telephone network, sometimes referred to as the PSTN. In-band signaling is commonly utilized to dial a number, control certain devices, and indicate responses. The most common form of in-band signaling is the use of dual tone multi-frequency signals, or DTMF signals, generated by pressing the buttons on a push button telephone. For example, when dialing in to access a voicemail system remotely, a user's access code or PIN number may be provided to the voicemail system by pressing the appropriate buttons on a push button phone to generate DTMF signals that can be decoded by the voicemail system. Or some business operations employ automated attendant systems to answer incoming phone calls, and users may indicate the extension to which they wish to be transferred by pressing corresponding buttons on a push button phone, or speak to an operator by pressing zero. The DTMF signals generated by the user's phone may be decoded by the automated attendant system and used to complete the call without the intervention of a human operator. Voice response systems respond to DTMF signals to allow callers to retrieve information such as the balance of the user's bank account, local weather forecasts, movie times, and many other types of useful information.

The PSTN telephone system is based upon a design that dates back many years before the days of personal computers, modems, and the Internet. The modern development of the Internet now provides an alternative route for the possible transmission of voice signals, in the form of digital packets of data that can be transmitted over a network using the internet protocol, sometimes referred to as an IP network. However, problems have arisen with the transmission of voice signals over an IP network, sometimes referred to as voice over IP. With the voice codecs commonly employed in voice over IP applications, DTMF and other in-band signals cannot be adequately reproduced if sent as digitized representations of the signals. The digital-to-analog conversion and compression techniques employed in voice over IP applications fail to reproduce DTMF signals without substantial distortion. The distortion is severe enough to make the DTMF signals recreated by digital-to-analog conversion at the receive end of the circuit sufficiently outside the specified requirements for such in-band signaling that the DTMF tones will often not be recognized correctly. The end result is that conventional DTMF detectors can be expected to frequently fail to detect such distorted DTMF signals reproduced from digitized representations received from an IP network.

DTMF signals consist of two simultaneous tones that must have certain characteristics to be recognized as valid DTMF signals. The low group of frequencies comprise 697, 770, 852 and 941 Hz. The high group of frequencies comprise 1209, 1336, 1477 and 1633 Hz. To be recognized as a valid DTMF signal, a DTMF signal must consist of two frequencies, one selected from the group of low frequencies, and one selected from the group of high frequencies. Specifications in effect in the United States provide that a DTMF detector must detect a DTMF signal when the dual tones are each within plus or minus 1.5% of the specified frequency. A DTMF detector must reject a DTMF signal if either of the dual tones deviate more than plus or minus 3.5% from the specified frequency. In addition, a DTMF signal must meet certain signal requirements sometimes referred to as "twist," where twist is defined as the ratio of the high group frequency tone energy to the low group frequency tone energy. The energy ratio of the two dual tones, or twist, that is detected must be within a specified range for the signal to be recognized as a valid DTMF signal: i.e., for U.S. applications it must be greater than or equal to −8 dB and less than or equal to 4 dB. In addition, the "on" time of a DTMF signal must be for a minimum of 40 milliseconds in U.S. applications, followed by an "off" time of a minimum of 40 milliseconds. The minimum cycle time is 93 milliseconds. The tolerable frequency deviation, twist, on-time, off-time, and cycle-time may vary for different countries. But in many applications, DTMF detection must consider tolerable frequency deviation, twist, on-time, off-time, and cycle-time, even though the applicable parameters may vary from the examples provided herein. For convenience, the applicable U.S. parameters are discussed herein, but those skilled in the art will appreciate that other parameters may be substituted, as applicable, without departing from the spirit and scope of the present invention.

The draft specification for RTP packet transport across an IP network currently specifies that DTMF signals should be removed from the RTP packets. However, in order to remove DTMF signals from other audio signals such as voice, the DTMF signals must be detected. Detection of DTMF signals takes a finite amount of time. In addition, normal speech often contains mixtures of various frequencies and many harmonics, which from time to time may momentarily contain frequency components equivalent to a DTMF signal. False detections are a problem. In addition, a valid DTMF signal should meet certain requirements in terms of the duration of the signal followed by a minimum "off" time, and a detection scheme preferably should examine the signal at least for the minimum cycle time to determine whether a valid DTMF signal has been detected.

In the past, efforts to remove DTMF signals have included schemes to delay all packets of digitized audio until the device could be sure that no DTMF tones were present, and then the packets would be transmitted. This method may introduce objectionable delay into the transmission. Such delay can detract from the quality of the voice over IP application, and interfere with efforts to conduct a natural conversation with someone. The performance is likely to be noticeably different from a conventional telephone conversation.

In the past, other efforts to remove DTMF signals have included schemes to transmit packets of digitized audio, and the stream of transmitted packets would be interrupted only when the detection of a valid DTMF signal was confirmed. Since it takes a finite amount of time to reliably detect a valid DTMF signal, some distorted DTMF tones were allowed to be transmitted for a length of time equal to the DTMF detection delay. This method is unsatisfactory because it does not completely remove DTMF signals, but instead allows distorted DTMF signals to be received at least momentarily on the remote end of the IP network. In many applications, the reception of distorted DTMF tones at the receiver can be objectionable, even if the tones are only for a momentary duration.

While the removal of DTMF signals from transmissions of digitized audio data has been recognized as a problem in voice over IP applications, efforts in the past to remove DTMF signals have not been altogether satisfactory. There is a significant need for an improved method and apparatus for removing DTMF signals from voice over IP packets that does not introduce excessive delay into the system, while at the same time effectively removing the DTMF signals so that distorted DTMF signals are not heard at the remote end of the IP connection.

SUMMARY OF THE INVENTION

In accordance with an exemplary embodiment of the present invention, a method and apparatus for early detection of in-band DTMF signals in voice transmissions to be sent over an IP network are provided. Using a digital signal processor, whenever any indication of signals possibly corresponding to the signals characteristic of DTMF tones are detected, packets of digitized audio data that would otherwise be sent over the IP network are delayed and temporarily stored in a buffer. Buffering the digitized audio data packets provides a period of time for digital signal processing techniques to reliably determine whether the characteristics of the detected signal are sufficient to characterize it as a DTMF signal. If a determination is made that the signal has the necessary characteristics of a valid DTMF signal, the buffered packets are discarded and a special control packet is sent formatted to convey to the recipient characteristic information for the detected DTMF signal sufficient to allow the DTMF signal to be generated by a DTMF generator. If a determination is made that the signal does not have the necessary characteristics of a valid DTMF signal, the buffered digitized audio packets are transmitted. The disclosed method and apparatus is effective to remove digitized audio representative of DTMF signals from RTP packet transmissions, and to replace the DTMF signals with RTP control packets, without introducing excessive delay into the system.

A method and apparatus in accordance with the present invention provides better removal of DTMF signal from digitized audio packets to be transmitted over an IP network, and minimizes the average delay incurred while the digitized audio is being processed to verify the DTMF signals and to minimize false detections.

BRIEF DESCRIPTION OF THE DRAWINGS

The present invention will hereinafter be described in conjunction with the appended drawing figures, wherein like numerals denote like elements, and.

DETAILED DESCRIPTION OF PREFERRED EXEMPLARY EMBODIMENTS

Figure 1:
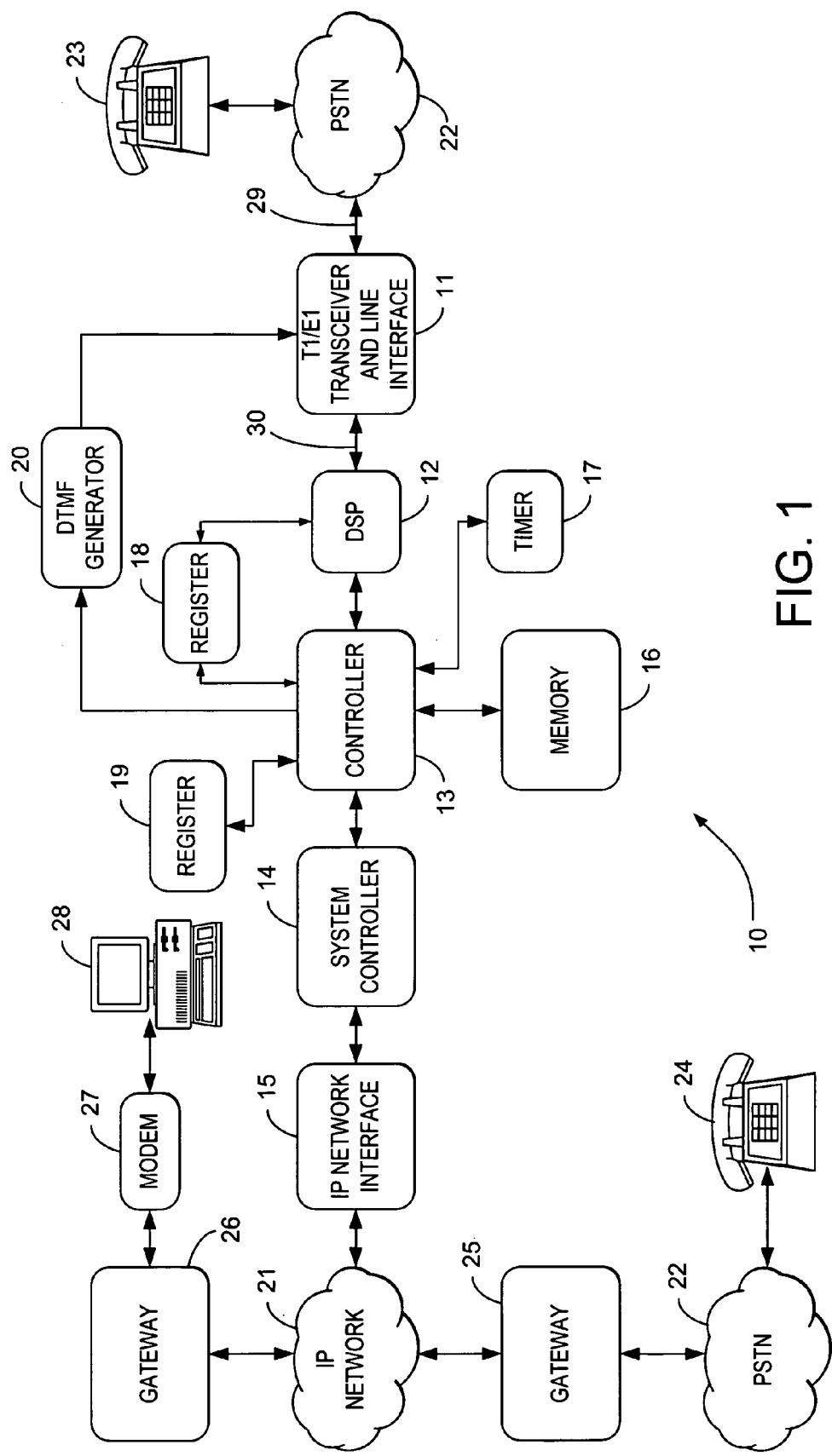
FIG. 1 is a block diagram depicting a schematic representation of an apparatus for transmitting voice over an IP network.

FIG. 1 is a block diagram showing an apparatus in accordance with the present invention for transmitting voice over a network 21 using the internet protocol, where such a network 21 is referred to herein as an IP network 21. Analog voice signals may originate from a local telephone 23 which is connected to the public switch telephone network, or PSTN 22. In this example, the analog voice signals generated by the telephone 23 may be converted into digital representation at a local office (not shown) in the PSTN 22 and transmitted over a T1 line 29 to an access server or media access gateway 10. Alternatively, the connection between the PSTN 22 and the gateway 10 may be via an E1 line. The signals generated by the local telephone 23 may also include DTMF signals generated when the user presses buttons on the push button phone 23.

In the example of a T1 line 29, the analog audio signal is typically sampled at 8000 Hz and PCM coded at the rate of 64 kilobits per second rate. This digital representation is adequate for representing reproducible DTMF signals as well. However, if voice signals are digitized at a rate of 64 kilobits per second rate, and that much data is sent over the IP network 21, it may overload the IP network 21. To avoid overloading the IP network 21, the audio and voice signals are decoded and then coded at a much lower bit rate, before the data is sent over the IP network 21. While such bit rates or levels of compression provide digital representations of voice with acceptable levels of distortion, the lower bit rate and/or higher level of compression is inadequate for providing digital representations of DTMF signals that can be reproduced at a remote telephone 24 without distortion sufficiently high as to make the reliable detection of DTMF digits virtually impossible or at least very difficult in practice. Therefore, any DTMF signals mixed in with the audio or voice signals must be detected and removed from the digitized representations of voice or audio sent over the IP network 21.

A method in accordance with the present invention for detecting and removing DTMF signals is performed by the access server 10. The access server 10 comprises a T1 transceiver or E1 transceiver and line interface 11, a DSP module 12, a controller 13, memory 16, a control register 18, a system controller or host 14, and an IP network interface 15. The access server 10 preferably comprises a timer 17 and a status register 19. The access server 10 may also include a DTMF generator 20. The access server 10 is coupled to the PSTN 22 via the T1/E1 transceiver and line interface 11, which provides a telephony interface 11.

The telephony interface 11 is coupled via a TDM bus 30 to a digital processor or DSP 12 for processing digital representations of audio signals to detect potential DTMF signals. The digital processor 12 is coupled to a microcontroller 13 which is operative to prepare the digital representations of audio signals for transmission as RTP packets of data. The microcontroller 13 is coupled to a system controller or host 14. In the absence of any DTMF signals, the RTP packets are passed to the host 14, which may assemble the data into packets of data according to a UDP/IP protocol. Alternatively, a TCP/IP protocol may be employed. The host 14 is coupled to an IP network interface 15, which is coupled to an IP network 21. The packets of data assembled by the host 14 are transmitted over the IP network 21 to a remote gateway 25. In this example, the remote gateway 25 is coupled to a remote telephone 24 via the PSTN 22. It will be understood that the remote gateway 25 comprises a media access gateway similar to access server 10, and therefore is not shown in further detail.

The microcontroller 13 is coupled to a memory 16 for temporarily storing RTP packets. The microcontroller 13 is coupled to a network interface 15 via the system controller 14, for coupling RTP packets to an IP network 21 (where the RTP packets are contained within UDP/IP packets). The control register 18 is a dual port register that is readable by both the microcontroller 13 and the digital processor 12. The control register 18 may also be written by both the microcontroller 13 and the digital processor 12. In the illustrated example, the control register 18 comprises an 8-bit register which is shown in more detail in FIG. 2.

Figure 2:
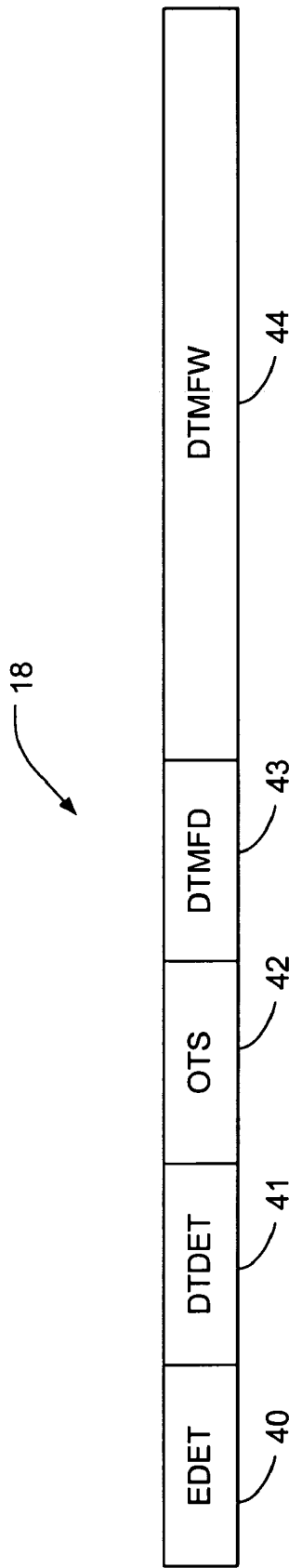
FIG. 2 is a block diagram depicting a schematic representation showing further details of a control register shown in FIG. 1.

Referring to FIG. 2, the control register 18 comprises a DTMF early detection flag bit 40, labeled EDET, which is indicative of the status of detection of a potential DTMF signal. The digital processor sets the status bit EDET 40 when DTMF signal energy is detected to indicate that the received signal is probably a DTMF signal. This early DTMF detection bit 40 is reset by the digital processor 12 when a valid DTMF signal is detected and confirmed, or when the received signal fails to satisfy subsequent DTMF detection and verification processing.

The control register 18 further comprises one or more flag bits 41, 42 and 43 indicative of the detection of a valid DTMF signal. The control register 18 includes a DTMF dual tone detected flag bit 41, labeled DTDET. The DTDET flag 41 is set by the digital processor 12 when the received signal has satisfied all DTMF detection criteria except minimum on-time, off-time, and cycle-time. In other words, the DTDET flag bit 41 is set when (a) the received signal is detected as having two simultaneous tones, one tone from the low group of frequencies (697, 770, 852 and 941 Hz), and one tone from the high group of frequencies (1209, 1336, 1477 and 1633 Hz); (b) the dual tones are each within a predetermined frequency tolerance, preferably plus or minus 1.5% of the specified frequency; (c) neither tone deviates more than a predetermined frequency deviation, preferably plus or minus 3.5% from the specified frequency; and (d) the twist requirements are met, i.e., the energy ratio of the two dual tones is within a predetermined range, preferably greater than or equal to −8 dB and less than or equal to 4 dB. The DTDET flag 41 is reset by the digital processor 12 if the received signal fails to satisfy required minimum on-time, off-time, or cycle-time.

The control register 18 includes a DTMF on-time satisfied flag bit 42, labeled OTS. The OTS flag bit 42 is set by the digital processor after the DTMF minimum on-time is satisfied. The DTMF minimum on-time is preferably 40 milliseconds, but other applicable minimum on-times may be employed as desired. The OTS flag bit 42 is reset by the digital signal processor 12 if the received signal fails to satisfy required minimum off-time or cycle-time. The DTMF minimum off-time is preferably 40 milliseconds, but other applicable minimum off-times may be employed as desired. The required cycle time is a minimum cycle time which is preferably 93 milliseconds, but other applicable minimum cycle-times may be employed as desired.

The control register 18 also includes a DTMF detected flag bit 43, shown in FIG. 2 and labeled DTMFD. The DTMF flag bit 43 is set by the digital processor 12 when a DTMF signal has been detected that satisfies all of the DTMF detection criteria. When the digital processor 12 sets the DTMFD flag bit 43, it resets the EDET flag bit 40, the DTDET flag bit 41, and the OTS flag bit 42.

The control register 18 also includes a 4-bit DTMF output word 44, labeled DTMFW. The digital processor 12 writes a 4-bit encoded DTMF output word to the DTMFW register just before setting the DTDET flag bit 41. The 4-bit code written to the DTMFW register 44 indicates what DTMF symbol or digit was detected. Suitable DTMF symbol codes which may be used in the DTMFW register 44 are provided in Table 1.

TABLE 1

| DTMF Symbol | DTMFW Output Word |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| * | 1010 |
| # | 1011 |
| A | 1100 |
| B | 1101 |
| C | 1110 |
| D | 1111 |

The microcontroller 13 can read the EDET flag bit 40, the DTDET flag bit 41, the OTS flag bit 42, the DTMFD flag bit 43, and the DTMFW output word 44. In a preferred embodiment, the microcontroller 13 resets the DTMFD flag bit 43 after reading the DTMF output word 44. Otherwise two or more detections of the same DTMF symbol may be missed by the microcontroller 13.

When the EDET flag bit 40 indicative of the status of detection of a potential DTMF signal is not set, RTP packets assembled by the microcontroller 13 are promptly coupled to the network interface 15 for transmission over the IP network 21. It will be understood by those skilled in the art that in this context, the RTP packets will be transmitted as the data portion of UDP packets over IP.

When the EDET flag bit 40 indicative of the status of detection of a potential DTMF signal is set, RTP packets assembled by the microcontroller 13 are temporarily stored in the memory 16 while the digital processor 12 continues to process the signal to verify whether it is a valid DTMF signal. If the EDET flag bit 40 indicative of the status of detection of a potential DTMF signal is reset, and the DTDET flag bit 41 indicative of the detection of a valid DTMF signal is not set, the RTP packets temporarily stored in the memory 16 are promptly coupled to the network interface 15 for transmission over the IP network 21. If the DTDET flag bit 41 indicative of the detection of a valid DTMF signal is set, the RTP packets temporarily stored in the memory 16 are discarded and a control packet is prepared by the microcontroller 13 where the control packet contains information indicative of characteristics of a DTMF signal and the control packet is coupled to the network interface 15 for transmission over the IP network 21.

The control packet containing information indicative of characteristics of a DTMF signal preferably comprises 32 bits of information in an RTP control packet, or RTCP packet, having a preferred format of:

RRRNNNNNRRVVVVVVDDDDDDDDDDDDDDDDD where "R" designates reserved bits; "N" designates bits of data representative of a DTMF digit; "V" designates bits of data representing the power level of the DTMF signal, expressed in dBm0 after dropping the sign; and, "D" designates bits of data indicating a duration for a DTMF signal, in timestamp units. The reserve bits are preferably set to zero. The "N" bits of data representative of a DTMF digit are preferably encoded (in a binary format) so that the following encoded data (for convenience shown as a decimal number) represents the indicated DTMF digit:

an encoded "0" represents a DTMF digit of 0
an encoded "1" represents a DTMF digit of 1
an encoded "2" represents a DTMF digit of 2
an encoded "3" represents a DTMF digit of 3
an encoded "4" represents a DTMF digit of 4
an encoded "5" represents a DTMF digit of 5
an encoded "6" represents a DTMF digit of 6
an encoded "7" represents a DTMF digit of 7
an encoded "8" represents a DTMF digit of 8
an encoded "9" represents a DTMF digit of 9
an encoded "10" represents a DTMF digit of *
an encoded "11" represents a DTMF digit of #
an encoded "12" represents a DTMF digit of A
an encoded "13" represents a DTMF digit of B
an encoded "14" represents a DTMF digit of C
an encoded "15" represents a DTMF digit of D.
an encoded "16" represents a Flash or flashhook signal.

The access server 10 is capable of generating DTMF signals from control packets received from the remote gateway 25. When a control packet containing information indicative of characteristics of a DTMF signal is received over the IP network 21 from the remote gateway 25, the control packet is recognized as a special control packet and is treated differently from RTP packets containing data in the form of digitized audio or voice. The control packet contains information from which a DTMF signal may be generated. The decoded data representing the characteristics of the DTMF signal may be passed to a DTMF generator or DTMF signal generator 20. The DTMF signal generator 20 generates a DTMF signal based upon data from the control packet indicating the DTMF digit that is to be generated, the power level of the DTMF signal, and the duration of the DTMF signal. Alternatively, the DSP 12 may be used to generate the DTMF signal, and a separate DTMF generator 20 may be omitted.

The remote gateway 25 shown in FIG. 1 includes a second network interface coupled to the IP network 21 at a remote location. The remote gateway also includes a second microcontroller coupled to the second network interface, and a digital-to-analog converter or second DSP coupled to the second microcontroller for converting digital representations of audio signals to analog signals. The analog signals are coupled to the remote telephone 24. The remote gateway 25 further includes a second DTMF signal generator coupled to the second microcontroller for generating DTMF signals having characteristics determined by information contained in the control packet sent by the first microcontroller 13.

Figure 3:
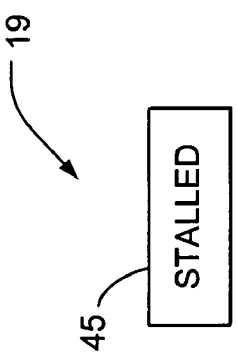
FIG. 3 is a block diagram depicting a schematic representation showing further details of a status register shown in FIG. 1.

While the microcontroller 13 is temporarily storing RTP packets of data in the memory 16, it may set a flag in the status register 19. The status register 19 is shown in more detail in FIG. 3. In the illustrated example, the status register 19 comprises a 1-bit register having a flag bit 45 labeled STALLED. When the STALLED flag bit 45 is set, it indicates that the buffer 16 contains RTP packets of data awaiting further DTMF processing and detection by the digital processor 12. Alternatively, the status register 19 may be omitted, and a STALLED flag may be stored in the memory 16, or implemented as a variable in any available random access memory accessible to the microcontroller 13.

A method in accordance with the present invention for removing DTMF signals from audio signals comprising the steps of examining audio signals for potential DTMF signals (using digital signal processing); preparing the audio signals for transmission as digital packets; and while no potential DTMF signals have been detected, promptly transmitting the digital packets over the IP network 21 after the packets have been scanned for early detection of DTMF. If a potential DTMF signal is detected, temporarily storing the digital packets in the memory 16 until DTMF detection can be performed. If the potential DTMF signal does not result in a DTMF detection, promptly transmitting the digital packets that were temporarily stored in the memory 16. If the potential DTMF signal does result in a DTMF detention, discarding the digital packets that were temporarily stored in the memory 16, and transmitting a control packet containing information relating to characteristics of a DTMF signal that was detected.

A method in accordance with the present invention for transmitting audio signals potentially including voice signals and DTMF signals over an IP network 21, preferably comprises the steps of processing digital representations of audio signals to detect potential DTMF signals; in a first mode of operation while no potential DTMF signal has been detected (a) preparing the digital representations of audio signals for transmission as RTP packets; and (b) promptly transmitting the RTP packets over the IP network 21. In a second mode of operation when a potential DTMF signal has been detected, the method comprises the steps of: preparing the digital representations of audio signals for potential transmission as RTP packets, and temporarily storing such RTP packets in the memory 16 while the potential DTMF signal is processed to verify whether it is a valid DTMF signal; (a) if the potential DTMF signal is determined to not be a valid DTMF signal, transmitting the RTP packets that were temporarily stored over an IP network 21; and, (b) if the potential DTMF signal is determined to be a valid DTMF signal; discarding the RTP packets that were temporarily stored in the memory 16, preparing an RTP control packet containing information indicative of characteristics of a DTMF signal, and transmitting the control packet over the IP network 21.

The method may further comprise the steps of receiving the RTP packets at a remote location coupled to the IP network 21; decoding the RTP packets to recover digital representations of audio signals; converting digital representations of audio signals to analog signals; receiving an RTP control packet at the remote location coupled to the IP network 21; and, generating DTMF signals having characteristics determined by information contained in the RTP control packets.

Figure 4:
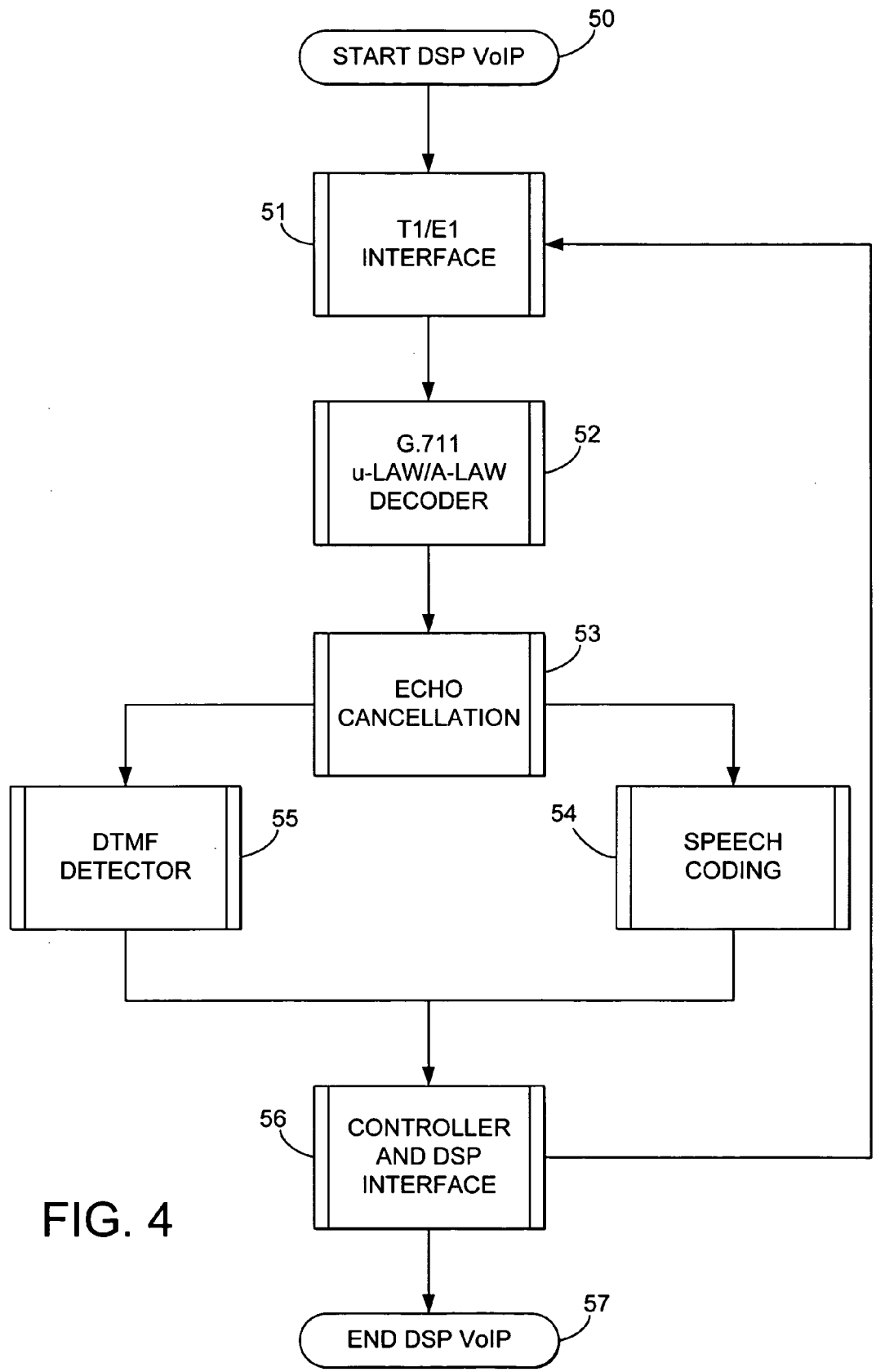
FIG. 4 is a flowchart depicting steps in a method performed by the DSP shown in FIG. 1.

A method according to the present invention may be better understood with reference to the flowchart shown in FIG. 4. FIG. 4 illustrates steps performed by the digital processor or DSP 12. Step 50 represents the start of the process. The DSP 12 receives data from the T1/E1 interface in step 51. In a preferred embodiment, the DSP 12 implements a G.711 codec mode optionally using a μ-Law PCM decoder or an A-Law PCM decoder. The DSP 12 may alternatively implement a G.723 codec mode, a G.729 codec mode, a G.726 codec mode, a G.727 codec mode, a G.728 codec mode, or other codecs as desired. The DSP 12 may be reconfigured by downloading software into the DSP 12 for substantially any desired codec. The DSP 12 also provides echo cancellation in step 53. An echo path delay from 8 milliseconds to 128 milliseconds may be selectively provided in 8 millisecond increments. The DSP 12 provides speech coding in step 54 (for data to be used when no DTMF signals are present). In the case where no DTMF signals are present, the encoded speech is provided to the controller 13 in step 56 through a controller and DSP interface. The process loops back to step 51 as long as data is being received to be processed. When no more data is received, the DSP processing is completed in step 57.

In FIG. 4, all data received is examined for DTMF signals in step 55, which preferably is performed in parallel with the speech encoding step 54. The DTMF detection processing step 55 is illustrated in more detail in FIG. 5A and FIG. 5B. The DTMF detector step 55 starts in FIG. 5A with step 60. The DSP 12 measures signal energy in step 61 by calculating wideband signal energy. Wideband signal energy may be calculated by methods known in the art. Preferably, in step 61 a sampled input signal is squared and then processed by an energy averaging IIR lowpass filter whose output is the instantaneous wideband signal energy.

Figure 5A:
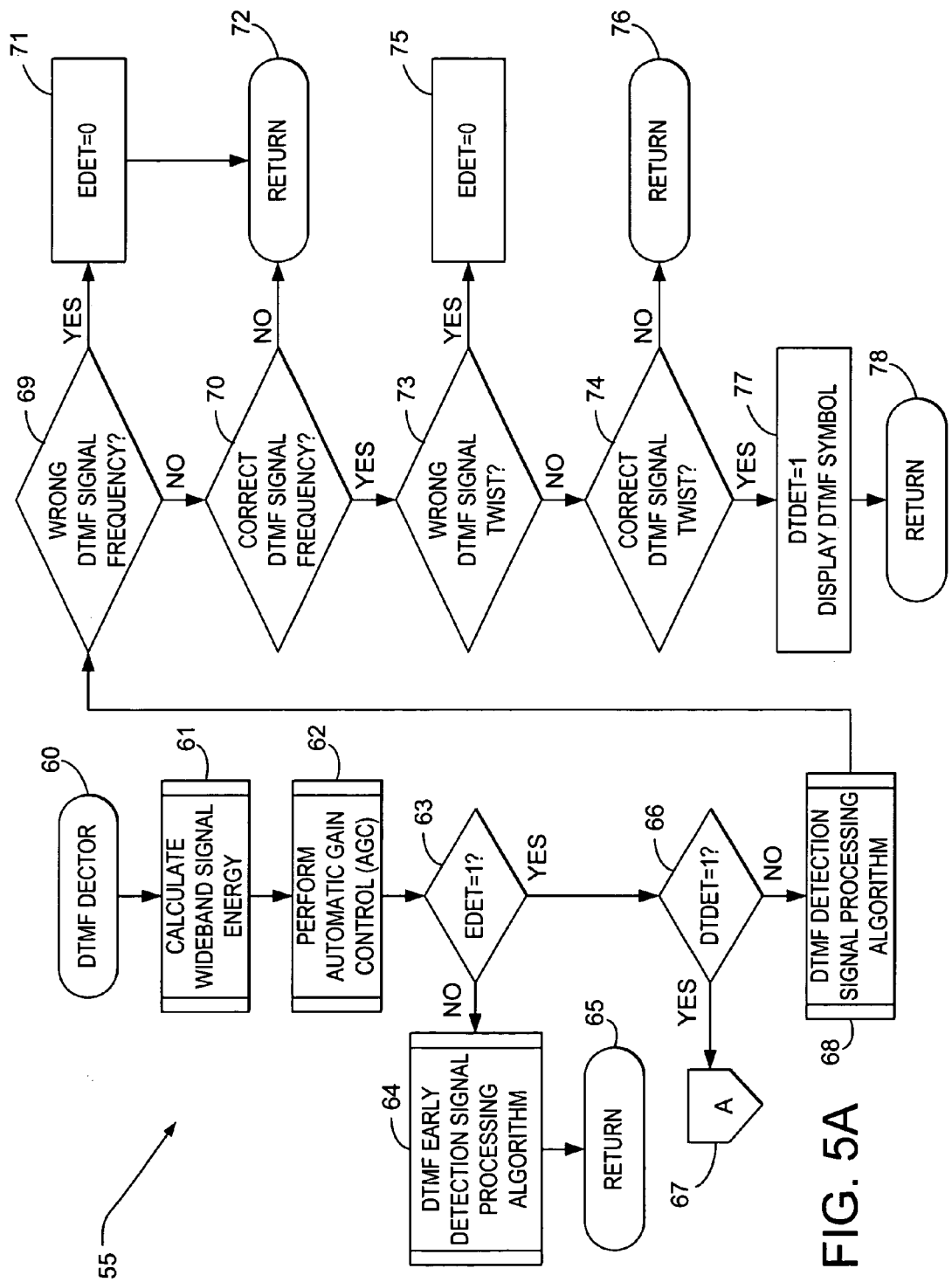
FIG. 5A is a flowchart depicting steps in a method performed by the DSP, showing further details for the DTMF detector step shown in FIG. 4.
Figure 9:
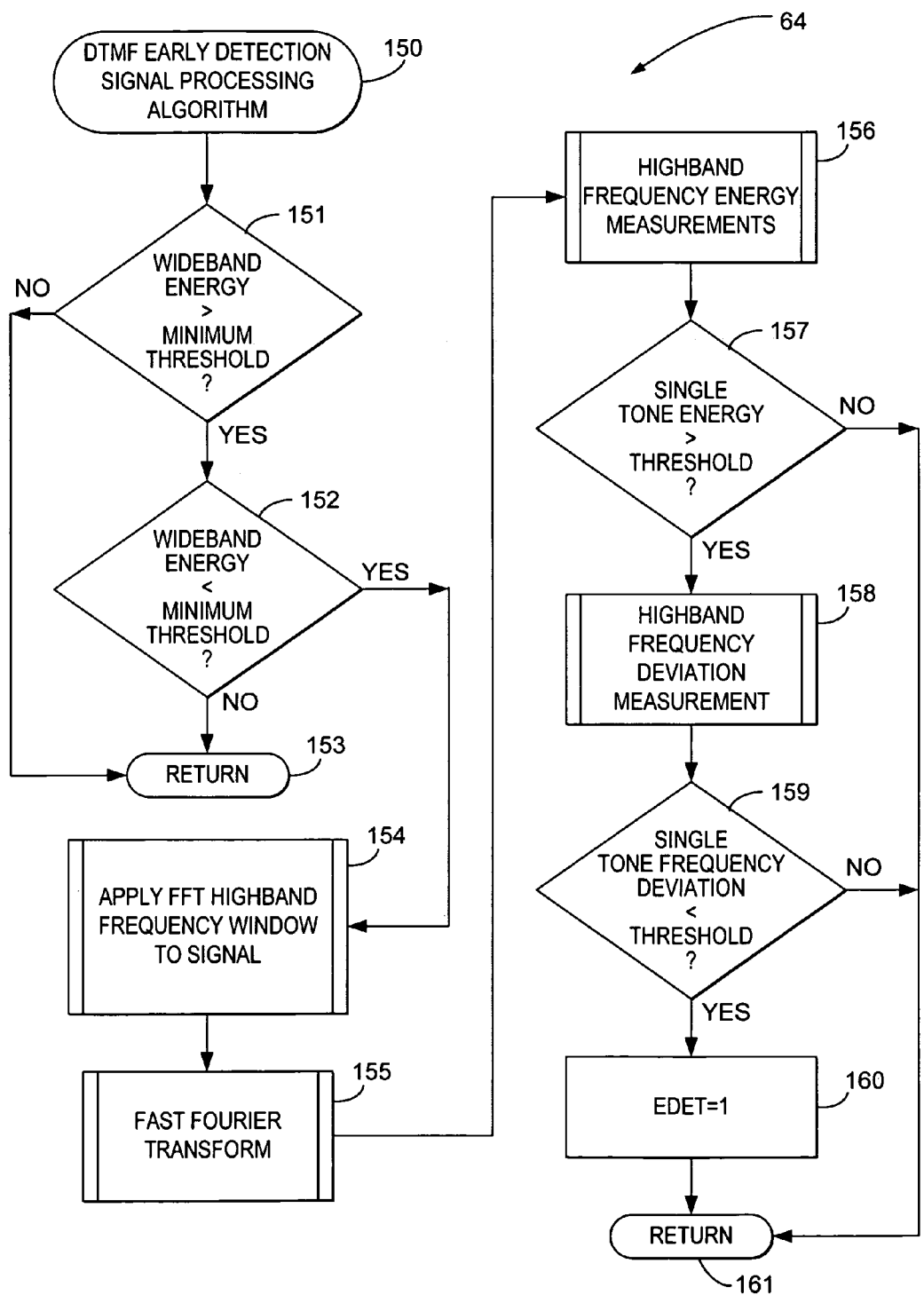

Referring to FIG. 5A, the DSP 12 performs automatic gain control on the signal in step 62. In step 63, the DSP 12 checks to see if the EDET flag 40 is set. If the EDET flag 40 is not set, the method proceeds to step 64 where early DTMF detection is performed. Further details of the early DTMF detection process are shown in FIG. 9. Referring to FIG. 5A, when the DTMF early detection signal processing algorithm has been completed, the method proceeds to step 65 and returns. When the return step 65 is executed, the method would proceed to step 56 shown in FIG. 4.

In step 63 shown in FIG. 5A, if the EDET flag 40 is set, the method proceeds to step 66, where the DSP 12 checks the DTDET flag 41 to determine if it is set. If the DTDET flag 41 is set, the method proceeds to the point 67 identified with the letter "A" in FIG. 5A. This corresponds to the point 67 shown in FIG. 5B and identified with the letter "A". Thus, if the DTDET flag 41 is set in step 66 in FIG. 5A, the next step in the method is step 130 shown in FIG. 5B. These steps in the method will be described further below.

Referring to FIG. 5A, in step 66 if the DTDET flag 41 is not set, the method proceeds to step 68 where the DTMF detection signal processing algorithm is performed. The DTMF detection signal processing algorithm of step 68 is additional processing required to complete a lowband frequency analysis (fast fourier transform). Because more frequency samples are used for lowband frequency analysis (697, 770, 852 and 941 Hz), the analysis of these additional samples takes longer than the analysis of the highband frequencies (1209, 1336, 1477 and 1633 Hz). The analysis of the lowband frequencies is similar to the analysis of the highband frequencies used in step 64, and the steps shown in more detail in FIG. 9 for the highband frequencies. Because the highband frequency analysis is used to determine whether to set a flag 40 indicating the early detection of a potential DTMF signal, the preferred frequency analysis is described in detail in connection with FIG. 9, and will not be described in detail here. Those skilled in the art will understand that the low group of frequencies are used in step 68, in place of the high group of frequencies used in step 64 and in the detailed description provided below in connection with FIG. 9.

The result of the tests performed on a potential DTMF signal is that the potential DTMF signal is preferably examined to determine whether the received signal has two simultaneous tones, one tone from the low group of frequencies (697, 770, 852 and 941 Hz), and one tone from the high group of frequencies (1209, 1336, 1477 and 1633 Hz), and whether neither of the tones deviates more than plus or minus 3.5% from the specified frequency, and whether the dual tones are each within plus or minus 1.5% of the specified frequency. In the illustrated embodiment, the high group of frequencies (1209, 1336, 1477 and 1633 Hz) are checked in connection with setting the early detection flag 40, and the low group of frequencies (697, 770, 852 and 941 Hz) are checked during the process of attempting to confirm whether the potential DTMF signal is a valid DTMF signal.

In step 69 shown in FIG. 5A, a potential DTMF signal is examined to determine whether it has the wrong signal frequency. If the potential DTMF signal has the wrong frequency, the method proceeds to step 71 where the EDET flag 40 is reset to zero (or turned "off"). The method then proceeds to step 72, where the method returns. In step 69, if the potential DTMF signal does not have the wrong frequency, the method proceeds to step 70, where the signal is checked to see if the potential DTMF signal has the correct DTMF signal frequency. Referring again to step 70, if the potential DTMF signal does not have the correct frequency, the method proceeds to step 72 and returns. This is logically possible if the fast fourier transform ("FFT") analysis has not been completed when steps 69 and 70 are performed. For the low group of frequencies, where more samples are used, it is possible at this point in the method that the FFT has not been completed, in which case, both step 69 and step 70 will result in a "no" determination. In that situation, step 72 may be reached via step 70. If step 72 is performed because a "no decision" condition in steps 69 and 70 resulted in a return, i.e., a FFT analysis of the low group of frequencies has not been completed, the signal frequency of the potential DTMF signal will be checked again on the next run through the loop.

In step 70, if the potential DTMF signal does have the correct frequency, the method proceeds to step 73 where the potential DTMF signal is checked to see if it has the wrong signal twist. If the potential DTMF signal does have the wrong twist, the method proceeds to step 75 where the EDET flag is reset to zero (or is cleared). The method then proceeds to step 76 and returns. In step 73, if the potential DTMF signal does not have the wrong twist, the method proceeds to step 74.

In step 74, the potential DTMF signal is checked to see of it has the correct signal twist. The twist requirements are preferably that the energy ratio of the two dual tones must be within the range of greater than or equal to −8 dB and less than or equal to 4 dB. The twist requirements employed in practice may vary depending upon the country or jurisdiction, or upon external specifications. If the DTMF does not have the correct signal twist, the method proceeds to step 76 and returns. This is logically possible if the required calculations for the twist analysis have not been completed when steps 73 and 74 are performed. It is possible at this point in the method that the calculations have not been completed, in which case, both step 73 and step 74 will result in a "no" determination. In that situation, step 76 can be reached via step 74. If step 76 is performed because a "no decision" condition in steps 73 and 74 resulted in a return, i.e., FFT calculations required for a twist analysis of the low group of frequencies was not been completed when steps 73 and 74 were performed, the signal twist of the potential DTMF signal will be checked again on the next run through the loop.

Referring to FIG. 5A, if the potential DTMF signal does have the correct twist in step 74, the method proceeds to step 77. In step 77, the DTMF signal is displayed. The DTMF signal is displayed by writing or loading a code into the DTMFW 4-bit register 44 for the DTMF word, indicating what DTMF symbol was detected (according to Table 1). The controller 13 can read the DTMFW register 44 to determine what DTMF digit was detected by the DSP 12. In step 77, after the DTMFW register 44 (shown in FIG. 2) is loaded, the DTDET flag 41 is set. Alternatively, the DTMF signal may be displayed by writing information to the memory 16 indicating the DTMF digit that was detected, and preferably also including information indicating the duration and volume of the DTMF signal that was detected. The memory 16 can be read by the controller 13, and the controller 13 can determine from the information written by the DSP 12 the information needed to construct a control packet indicating the characteristics of the DTMF signal that was detected by the DSP 12. After step 77 is completed, the method proceeds to step 78 and returns.

Figure 5B:
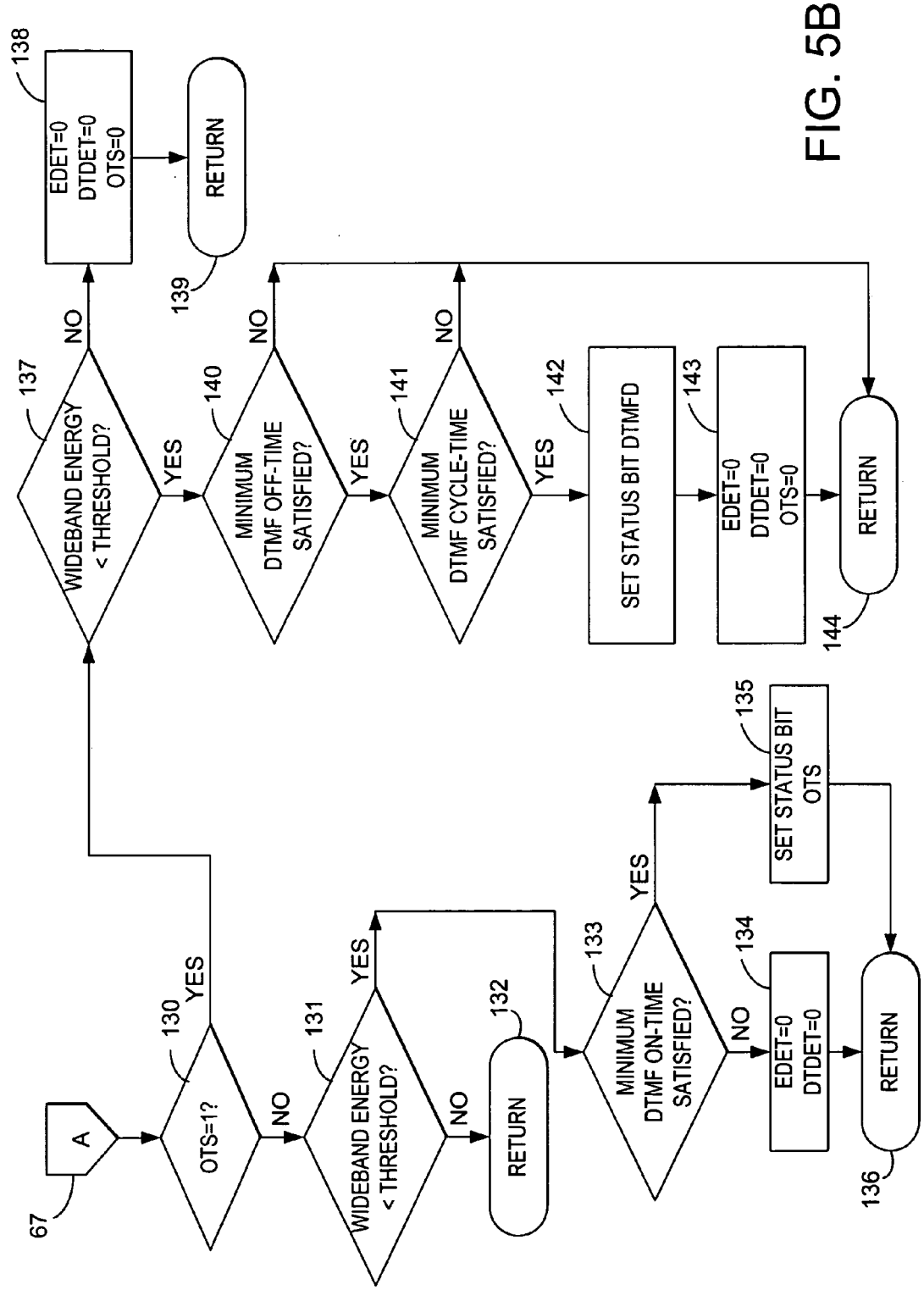
FIG. 5B is a continuation of the flowchart shown in FIG. 5A.

In step 66 shown in FIG. 5A, if the DTDET flag 41 is set, the method proceeds to step 130 shown in FIG. 5B. In step 130, the OTS flag 42 (shown in FIG. 2) is checked to determine whether it is set. If the OTS flag 42 is not set, the method proceeds to step 131 where the potential DTMF signal is checked to determine if its wideband energy is below a predetermined threshold. If the potential DTMF signal does not have wideband energy below the predetermined threshold, the method proceeds to step 132 and returns. In step 131, the the potential DTMF signal does have energy below the predetermined threshold, the method proceeds to step 133 where the potential DTMF signal is checked to determine whether a predetermined minimum on-time is satisfied. The signal is preferably tested to determine whether it remains on for at least 40 milliseconds, but other predetermined minimum on-times may be employed, depending upon the applicable country or jurisdiction. If the predetermined minimum DTMF on-time was not satisfied in step 133, the method proceeds to step 134 where the EDET flag 40 is reset to zero and the DTDET flag 41 is reset to zero. The method then proceeds to step 136 where it returns.

In step 133, if the potential DTMF signal does have the predetermined minimum on-time, the method proceeds to step 135 where the OTS status bit 42 is set (in this example, "set" means the bit is changed to a logical "1"). The method then proceeds to step 136 and returns.

Referring to FIG. 5B, in step 130 if the OTS status bit 42 is set, the method proceeds to step 137 where the potential DTMF signal is tested to determine whether it has wideband energy below a predetermined threshold level. If not, the method proceeds to step 138, where the EDET flag 40, the DTDET flag 41, and the OTS flag 42 are all reset to zero. Then the method proceeds to step 139 and returns.

The wideband energy thresholds used in steps 131 and 137 are used to detect sudden drops and rises in the wideband signal energy. Sudden rises and drops are inconsistent with a non-impaired DTMF signal before the minimum on-time is satisfied, but are consistent with a voice signal. The threshold values are preferably selected based upon empirical testing, and those skilled in the art will understand how to set appropriate threshold values after having the benefit of this disclosure.

In step 137, if the wideband energy of the potential DTMF signal is below a predetermined threshold level, the method proceeds to step 140, where a determination is made whether the potential DTMF signal meets predetermined minimum off-time requirements, in the illustrated example the off-time is 40 milliseconds. Although a preferred off-time of 40 milliseconds is used in this example, other predetermined minimum off-times may be used, depending upon the applicable country or jurisdiction. If the potential DTMF signal does not meet the predetermined minimum off-time, the method returns via step 144. If the potential DTMF signal does meet the predetermined minimum off-time requirements in step 140, the method proceeds to step 141 to determine whether the potential DTMF signal meets the cycle-time requirements (i.e., in this particular example a minimum cycle-time of 93 milliseconds). If the potential DTMF signal does not meet the minimum cycle-time requirements, the method returns via step 144. If the potential DTMF signal does meet the minimum cycle-time requirements in step 141, the method proceeds to step 142 where the DTMFD flag 43 is set. The method proceeds to step 143, where the EDET flag 40, the DTDET flag 41, and the OTS flag 42 are all reset to zero. Then the method proceeds to step 144 and returns.

FIG. 9 illustrates details of the steps performed in the DTMF early detection signal processing algorithm step 64 shown in FIG. 5A. Referring to FIG. 9, the DTMF early detection signal processing algorithm is where a signal is examined to determine whether it may be a potential DTMF signal, and the algorithm starts in step 150. In step 151, the signal being examined is tested to determine whether it has wideband energy greater than a predetermined minimum threshold. If the signal does not have wideband energy greater than a predetermined minimum threshold, the method proceeds to step 153 and returns. If the signal does have wideband energy greater than a predetermined minimum threshold, the method proceeds to step 152, and the signal is examined to determine whether it has wideband energy less than a predetermined maximum threshold. If the signal examined in step 152 does not have wideband energy less than a predetermined maximum threshold, the method proceeds to step 153 and returns. In step 152, if the signal being examined does have wideband energy less than a predetermined maximum threshold, the signal thus far satisfies tests for a DTMF signal, and is further processed in step 154.

The minimum and maximum wideband energy thresholds used in steps 151 and 152 are used to detect sudden drops and rises in the wideband signal energy. Sudden rises and drops are inconsistent with a non-impaired DTMF signal before the minimum on-time is satisfied, but are consistent with a voice signal. The threshold values are preferably selected based upon empirical testing, and those skilled in the art will understand how to set appropriate threshold values after having the benefit of this disclosure.

In step 154 shown in FIG. 9, a fast fourier transform (FFT) highband frequency window is applied to the signal being examined using well known digital signal processing techniques. Then in step 155, a fast fourier transform is applied to the signal. The method then proceeds to step 156 where highband frequency energy measurements are applied to the signal.

The fast fourier transform (FFT) highband frequency window used in step 154 is the Minimum Two Term Blackman Harris. This FFT window is useful for accurate frequency deviation measurements. The fast fourier transform applied in step 155 is the Goertzel algorithm. This fast fourier transform is useful for low complexity frequency domain analysis. The parameters used in the fast fourier transform analysis are dependant upon the number of samples used and the frequencies to be sampled. The number of samples is preferably chosen to minimize the processing delay, provided sufficient frequency resolution is achieved for accurate DTMF signal detection, and may depend upon the speed of the DSP 12. Six frequencies are preferably sampled for the low frequency group and the high frequency group, including the nominal frequencies and two additional frequencies just below and above each group. In a preferred threshold test, only energy from one frequency in the group is allowed to be above the predetermined minimum energy threshold, and the ratio of this energy to all others must be greater than another threshold. These thresholds are used to distinguish a DTMF signal from background noise and voice, and the latter ratio threshold is also used to ensure frequency deviation tolerance. In practice, the conflicting requirements between (a) minimizing processing delay and (b) providing sufficient frequency resolution, have led to the preferred use of a different number of samples for frequency domain analysis of the high frequency group as opposed to frequency domain analysis of the low frequency group. The number of samples used for the high frequency group is less than the number of samples used for the low frequency group. For this reason, the highband frequency energy measurements are preferably used in step 156 for making a decision of whether to set a flag 40 indicating the early detection of a potential DTMF signal. In other words, because fewer samples are used for the highband frequency energy measurements, the analysis of those samples can be completed more quickly than the analysis of the number of samples used for the low frequency group, and steps 156, 157, 158 and 159 can be performed to decide whether to set the EDET flag 40 before the analysis of the low frequency samples has been completed.

In step 157, the signal is examined to determine whether the single tone energy of the suspected DTMF tones are greater than a predetermined minimum threshold. The single tone energy tested preferably includes all high group tones. The low frequency tones are preferably not used in the illustrated embodiment, because in practice the processing of the low frequency samples is unlikely to be completed soon enough. The test in step 157 preferably checks each high tone frequency (1209 Hz, 1336 Hz, 1477 Hz and 1633 Hz) to make sure that there is one and only one tone with energy above the predetermined threshold. If the signal does not have single tone energy greater than the predetermined minimum threshold, the signal is not considered to be a valid DTMF signal, and the method proceeds to step 161 and returns. In step 157, if the signal being examined does have single tone energy greater than a predetermined minimum threshold, the method proceeds to step 158 where highband frequency deviation measurements are performed on the signal. In step 159, the signal is examined to determine whether the single tone frequency deviation is less than a predetermined maximum threshold. If the signal is not less than a predetermined maximum frequency deviation threshold in step 159, the method proceeds to step 161 and returns. In step 159, if the signal is less than a predetermined maximum frequency deviation, the signal is determined to be a potential DTMF signal, and the method proceeds to step 160 where an early DTMF detection status bit is set. The EDET flag 40 is the early DTMF detection status bit. Thus, in step 160, the signal being examined is determined to be a potential DTMF signal and the EDET flag 40 is set. The method then proceeds to step 161 and returns. The method would then proceed in FIG. 5A by going from step 64 to step 65.

In a method in accordance with the present invention, once a determination is made that the signal is a potential DTMF signal (sometimes referred to as early detection of DTMF), the EDET flag 40 is set and serves as a status bit indicating that an early detection of a potential DTMF signal has been made. The EDET flag 40 can be read by the controller 13. Further processing of the potential DTMF signal will be performed by the DSP 12 to determine whether the potential DTMF signal is a valid DTMF signal. Meanwhile, during the time that such further processing is being performed by the DSP 12, RTP packets being assembled by the controller 13 will be buffered in the memory 16 and stored temporarily until such further processing has been completed. In a preferred embodiment of the present invention, if the potential DTMF signal is determined to meet tests sufficient to set the DTDET flag 41, the RTP packets stored temporarily in memory 16 are discarded and an RTP control packet is assembled based upon information in the DTMFW register 44. If the EDET flag 40 is cleared, and the DTDET flag 41 is not set, the controller assumes that the potential DTMF signal was determined to not be a valid DTMF signal, and the packets stored temporarily in memory 16 are then sent to the host 14 for transmission over the IP network 21.

Figure 6:
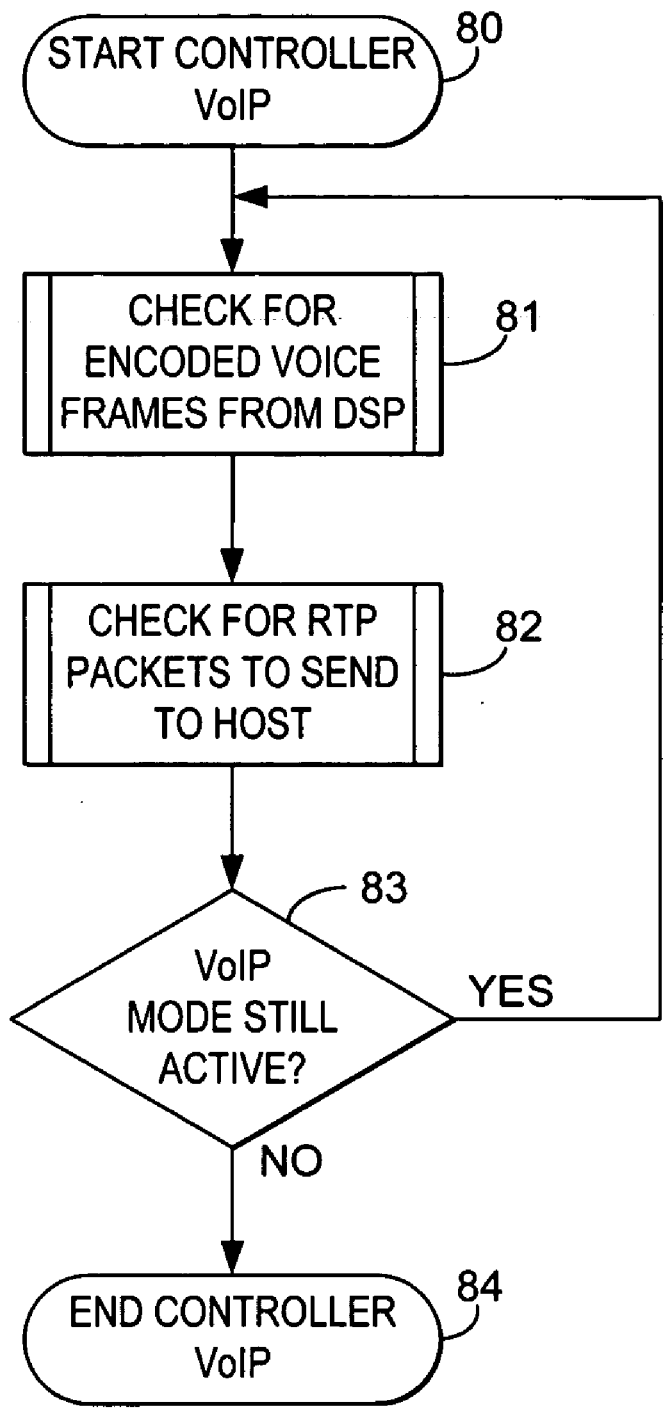
FIG. 6 is a flowchart depicting steps in a method performed by the controller shown in FIG. 1.

FIG. 6 illustrates steps performed by the controller 13. Step 80 represents the start of the process. The controller 13 checks to determine whether it has received encoded voice frames from the DSP 12 in step 81. In step 82, the controller 13 checks for RTP packets to pass to the system controller or host 14. In step 83, a determination is made whether the voice over IP mode is still active. If it is, the process loops back to step 81. If the voice over IP mode is not still active in step 83, the process proceeds to step 84 where it ends.

Figure 7:
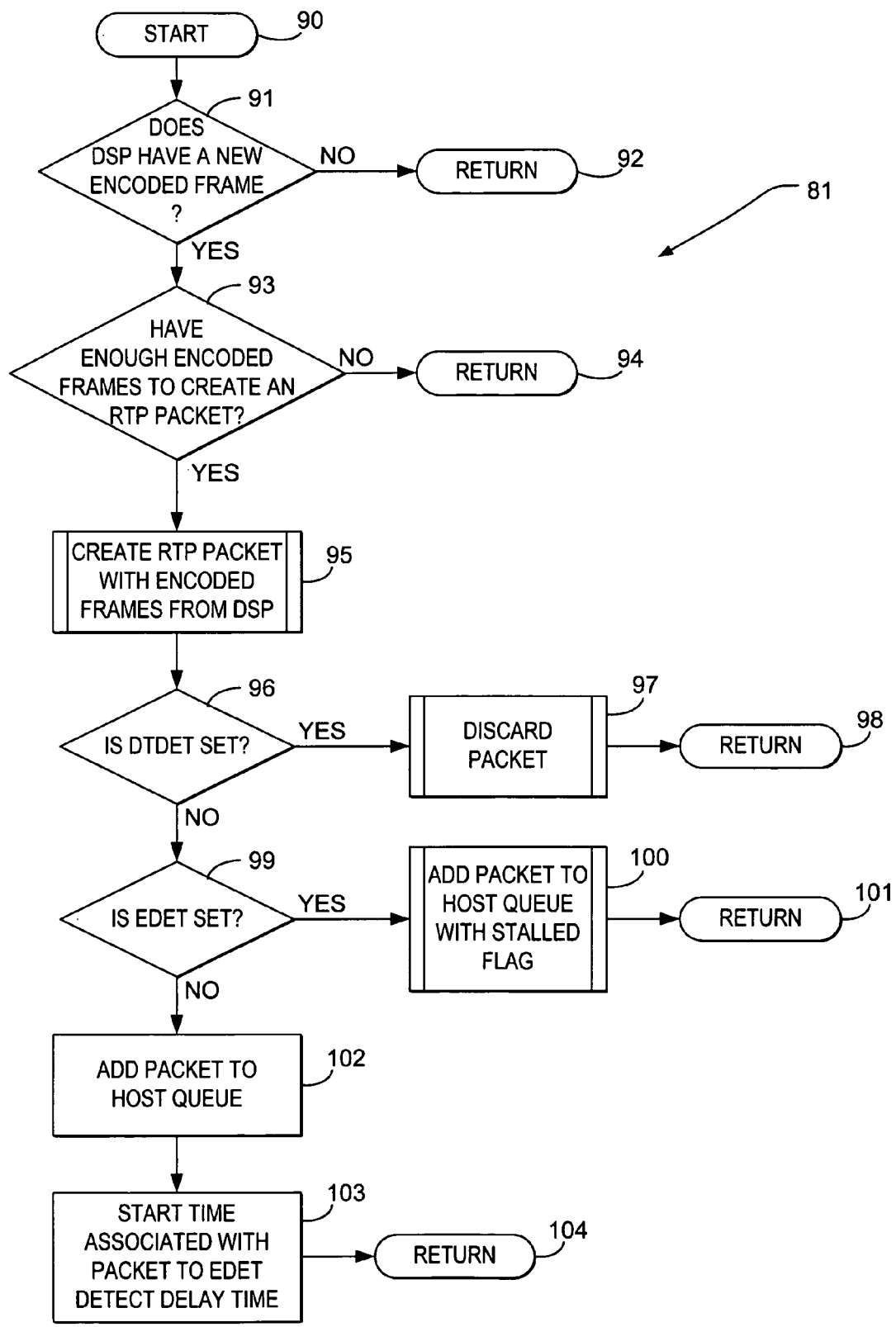
FIG. 7 is a flowchart depicting steps in a method performed by the controller, showing further details for the step of checking for encoded voice frames from the DSP shown in FIG. 6.

The method used by the controller 13 in step 81 to check and determine whether it has received encoded voice frames from the DSP 12 is shown in further detail in FIG. 7. The process starts with step 90. In step 91, the controller 13 checks to determine whether the DSP 12 has a new encoded frame of data available for the controller 13. If not, the method proceeds to step 92 and returns. If a new encoded frame of data is available in step 91, the method proceeds to step 93 where a determination is made whether enough encoded frames of data are available from the DSP 12 to create an RTP packet. If not, the method proceeds to step 94 and returns. If enough encoded frames are available in step 93 to create an RTP packet, the method proceeds to step 95 and an RTP packet is created with the encoded frames received from the DSP 12.

The process according to the present invention proceeds to step 96, where a determination is made whether the DTDET flag 41 is set. If the DTDET flag 41 is set, the RTP packet is discarded in step 97 (because the packet contains DTMF), and the method proceeds to step 98 and returns. If the DTDET flag 41 is not set in step 96, the process proceeds to step 99 and the controller 13 checks the EDET flag 40 to see if it is set.

If the EDET flag 40 is read by the controller 13 and found to be set in step 99, (meaning that the DSP 12 has made an early detection of DTMF and a potential DTMF signal may be present), the controller 13 executes step 100 and places the RTP packet in a host queue in buffer memory 16. The method then proceeds to step 101 and returns.

If the EDET flag 40 is read by the controller 13 and has not been set in step 99, (meaning that the DSP 12 has not yet made an early detection of DTMF), the controller 13 executes step 102 and places the RTP packet in a host queue. The controller 13 then executes step 103 and starts timer 17 to count down from a predetermined early DTMF detection delay time. In a preferred embodiment, the predetermined early DTMF detection delay time is 20 milliseconds, and is the time required for the DSP 12 to perform early detection of DTMF. The method proceeds to step 104 and returns.

Figure 8:
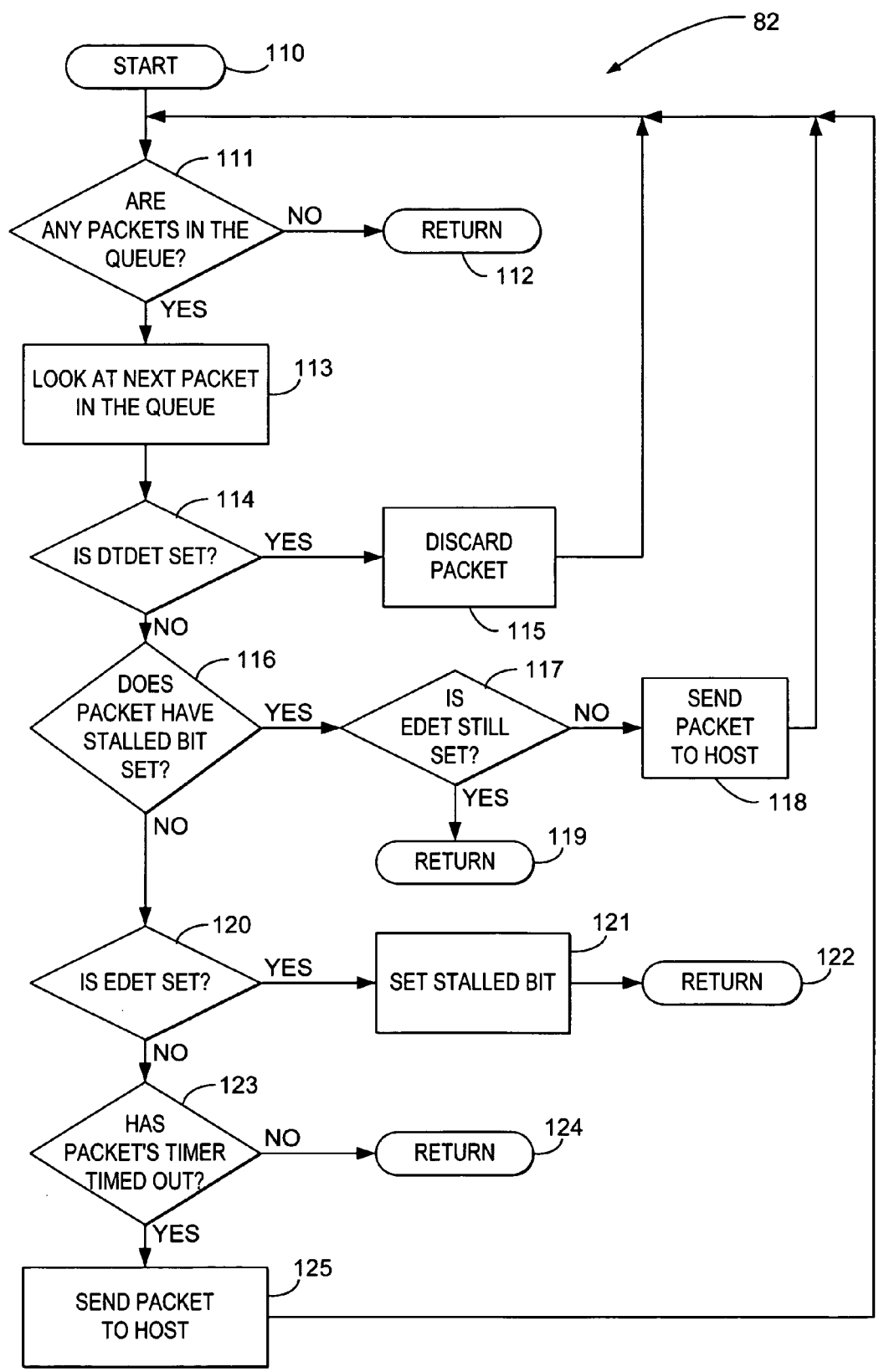
FIG. 8 is a flowchart depicting steps in a method performed by the controller, showing further details for the step of checking for RTP packets to send to the host shown in FIG. 6; and, FIG. 9 is a flowchart depicting steps in a method performed by the DSP, showing further details for the DTMF early detection signal processing algorithm step shown in FIG. 5A.

The process of checking for RTP packets to send to the host 14 (shown in FIG. 6 as step 82) is illustrated in further detail in FIG. 8. The process starts with step 110. The method proceeds to step 111, where a determination is made whether any RTP packets are in the host queue. If none are present in the host queue, the method proceeds to step 112 and returns. If packets are present in the host queue in step 111, the method proceeds to step 113 where the controller 13 looks at the next packet in the queue. In step 114, the controller 13 checks the DTDET flag 41 to see if it is set. If the DTDET flag 41 is set, the controller 13 discards the packet in step 115 (because it contains DTMF signals) and loops back to step 111.

In step 114, if the DTDET flag 41 is not set, the controller 13 proceeds to step 116 and checks the status register 19 to determine whether the STALLED flag 45 is set. Alternatively, the STALLED flag may be a variable stored in memory 16, or may comprise a bit associated with a packet (such as one bit in a header). Thus, in step 116, the controller 13 checks to determine whether the packet in question has a STALLED flag bit set. If the STALLED flag is set, it means that RTP packets are being buffered and stored temporarily because the DSP 12 made an early detection of DTMF, and the controller 13 is waiting on the DSP to determine whether the potential DTMF signal detected turns out to be a valid DTMF signal, or whether the early detection of DTMF was a "false alarm." In step 116, if the STALLED flag is set, the method proceeds to step 117 and the controller checks the EDET flag 40 in the control register 18 to determine whether the EDET flag 40 is still set. If the EDET flag 40 is still set (the DSP 12 is still performing DTMF detection), the controller 13 proceeds to step 119 and returns. If in step 117 a determination is made that the EDET flag 40 is not still set, the controller 13 proceeds to step 118 and the RTP packet is sent to the host 14. The method then loops back to step 111.

In step 116, if a determination is made that the STALLED flag 45 is not set, the method proceeds to step 120 where the controller 13 examines the EDET flag 40 to determine whether it is set. In step 120, if the EDET flag 40 is set, the controller 13 proceeds to step 121 and sets the STALLED flag 45. The controller then executes step 122 and returns.

In step 120, if the EDET flag 40 is not set, the controller 13 proceeds to step 123 and checks the timer 17 to determine whether it has timed out. If the timer 17 has not timed out yet, the DSP 12 may still not have completed early detection of DTMF. The illustrated method contemplates that it will take a finite amount of time to perform early detection of DTMF, i.e., to determine whether a potential DTMF signal is contained in the packet of data that is being examined. The method checks the timer 17 to determine whether sufficient time has elapsed for the early detection process to be completed before proceeding to release the packet of data for transmission. If the timer 17 has not timed out in step 123, the controller 13 proceeds to step 124 and returns. However, in step 123 if the timer 17 has timed out, the controller 13 proceeds to step 125 and sends the packet to the host 14. The controller 13 then loops back to step 111, as shown in FIG. 8.

In a preferred method, the controller 13 may decide whether to discard packets based upon the DTDET flag 41. In such an embodiment of the invention, the OTS flag 42 and the DTMFD flag 43 may not be used. Such a method may provide reliable results and minimize delay, because it takes less time for the DSP 12 to set the DTDET flag 41, as compared to the time it takes the DSP 12 to perform all of the steps necessary to make a decision on the status of the OTS flag 42 or DTMFD flag 43. In effect, a packet is deemed to contain DTMF signals if the signal passes only the tests required for the DTDET flag 41 to be set. In this embodiment of the method, a packet of data is discarded as containing a DTMF signal is the DSP 12 determines that the potential DTMF signal has two simultaneous tones, one tone from the low group of frequencies (697, 770, 852 and 941 Hz), and one tone from the high group of frequencies (1209, 1336, 1477 and 1633 Hz), the dual tones are each within plus or minus 1.5% of the specified frequency; neither of the tones deviates more than plus or minus 3.5% from the specified frequency; and the twist requirements are met, i.e., the energy ratio of the two dual tones are within the range of greater than or equal to −8 dB and less than or equal to 4 dB. This preferred embodiment of the method does not wait on the on-time, off-time, and cycle-time tests to be performed.

However, in an alternative embodiment of the method, a decision is made to discard a packet based upon the DTMFD flag 43. This alternative embodiment is useful in applications where greater reliability is demanded at the cost of additional delay.

Referring to FIG. 1, the access server or gateway 10 may be coupled over the IP network 21 to a third remote gateway 26. The third remote gateway 26 is coupled to a modem 27. The modem 27 is coupled to a personal computer 28, which includes a microphone and speakers (not shown). In accordance with the present invention, the personal computer 28 may be used to place phone calls over the Internet 21. It will be understood by those skilled in the art that the third gateway 26 includes similar elements to those illustrated and described in detail as part of the access gateway 10.

Additional information is contained in a document entitled "RTP Payload for DTMF Digits, Telephony Tones and Telephony Signals," a draft by the Internet Engineering Task Force, available over the Internet at ftp://ftp.isi.edu/internet-drafts/draft-ietf-avt-tones-00.txt, the entire disclosure of which is incorporated herein by reference. And additional information is also contained in a document entitled "RTP Payload for DTMF Digits," a draft by the Internet Engineering Task Force, available over the Internet at ftp://ftp.isi.edu/internet-drafts/draft-ietf-avt-dtmf-01.txt, the entire disclosure of which is incorporated herein by reference.

Those skilled in the art will appreciate, after having the benefit of this disclosure, that various modifications may be made to the specific embodiment of the invention described herein for purposes of illustration without departing from the spirit and scope of the invention. For example, elements of the invention shown in the illustrated embodiment as implemented in hardware may be implemented in software, and vice versa. In addition, registers may be implemented instead in random access memory, or alternatively information stored in registers may instead be stored in random access memory. Design tradeoffs preferred in the described embodiment because of limitations in processing speeds may not be needed or may be implemented differently where faster processing speeds are available. In an implementation where faster processing speeds are available, additional frequency samples may be used for the highband or lowband frequency analysis, or both. The description of a preferred embodiment provided herein is intended to provide an illustration of the principles of the invention, and to teach a person skilled in the art how to practice the invention. The invention, however, is not limited to the specific embodiment described herein, but is intended to encompass all variations within the scope of the appended claims.

We claim:

1. A method for removing DTMF signals from audio signals comprising the steps of:
    examining audio signals for potential DTMF signals;
    preparing the audio signals for transmission as digital packets;
    while no potential DTMF signals have been detected, promptly transmitting a digital packet after sufficient time has elapsed for a potential DTMF signal to be detected in said digital packet; and
    if a potential DTMF signal is detected, storing the digital packets and stalling transmission of stored digital packets until DTMF detection can be performed, and if the potential DTMF signal does not result in a DTMF detection, promptly transmitting the stored digital packets, and if the potential DTMF signal does result in a DTMF detection, discarding the stored digital packets and transmitting a control packet containing information relating to characteristics of a DTMF signal that was detected.

2. The method according to claim 1, wherein:
    the step of preparing the audio signals for transmission as the digital packets comprises preparing the audio signals for transmission as RTP packets.

3. The method according to claim 1, wherein:
    the step of transmitting said digital packet includes transmitting the digital packets over an IP network.

4. The method according to claim 2, further comprising the step of:
    transmitting the RTP packets over an IP network.

5. The method according to claim 1, wherein:
    the audio signals include digitized representations of voice signals.

6. The method according to claim 2, wherein:
    the audio signals include digitized representations of voice signals.

7. The method according to claim 3, wherein:
    the audio signals include digitized representations of voice signals.

8. The method according to claim 5, wherein:
    the step of examining the audio signals for potential DTMF signals is performed using digital signal processing.

9. The method according to claim 6, wherein:
    the step of examining the audio signals for potential DTMF signals is performed using digital signal processing.

10. The method according to claim 7, wherein:
    the step of examining the audio signals for potential DTMF signals is performed using digital signal processing.

11. The method according to claim 2, further comprising the step of:
    when the potential DTMF signal does result in a DTMF detection, preparing a control packet comprising 32 bits of information having a format of:
    RRRNNNNNRRVVVVVVDDDDDDDDDDDDDDDDD
    where "R" designates reserved bits;
    "N" designates bits of data representative of a DTMF digit;
    "V" designates bits of data representing the power level of the DTMF signal, expressed in dBm0 after dropping the sign; and,
    "D" designates bits of data indicating a duration for a DTMF signal, in timestamp units.

12. The method according to claim 11, wherein:
    the "N" bits of data representative of a DTMF digit are encoded so that the following encoded data represents the indicated DTMF digit:
    an encoded "0" represents a DTMF digit of 0
    an encoded "1" represents a DTMF digit of 1
    an encoded "2" represents a DTMF digit of 2
    an encoded "3" represents a DTMF digit of 3
    an encoded "4" represents a DTMF digit of 4
    an encoded "5" represents a DTMF digit of 5
    an encoded "6" represents a DTMF digit of 6
    an encoded "7" represents a DTMF digit of 7
    an encoded "8" represents a DTMF digit of 8
    an encoded "9" represents a DTMF digit of 9
    an encoded "10" represents a DTMF digit of *
    an encoded "11" represents a DTMF digit of #
    an encoded "12" represents a DTMF digit of A
    an encoded "13" represents a DTMF digit of B
    an encoded "14" represents a DTMF digit of C
    an encoded "15" represents a DTMF digit of D.

13. The method according to claim 12, wherein:
    the "N" bits of data representative of a DTMF digit are encoded so that the following encoded data represents the indicated DTMF digit:
    an encoded "16" represents a Flash.

14. The method according to claim 11, wherein:
    the reserve bits are set to zero.

15. The method according to claim 12, wherein:
    the reserve bits are set to zero.

16. The method according to claim 13, wherein:
    the reserve bits are set to zero.

17. A method for transmitting audio signals potentially including voice signals and DTMF signals over an IP network, comprising the steps of:
    processing digital representations of audio signals to detect potential DTMF signals;
    in a first mode of operation while no potential DTMF signal has been detected (a) preparing the digital representations of audio signals for transmission as RTP packets; and (b) transmitting an RTP packet over an IP network after a predetermined period of time sufficient to allow the step of processing digital representations of audio signals to detect potential DTMF signals to be completed for said RTP packet;
    in a second mode of operation when a potential DTMF signal has been detected, preparing the digital representations of audio signals for potential transmission as RTP packets, storing the RTP packets and stalling transmission of stored RTP packets while the potential DTMF signal is processed to verify whether it is a valid DTMF signal;

(a) if the potential DTMF signal is determined to not be a valid DTMF signal, transmitting the stored RTP packets over an IP network; and, (b) if the potential DTMF signal is determined to be a valid DTMF signal; discarding the stored RTP packets, preparing an RTP control packet containing information indicative of characteristics of a DTMF signal, and transmitting the control packet over an IP network.

18. The method according to claim 17, further comprising the steps of:

receiving the RTP packets at a remote location coupled to an IP network; decoding the RTP packets to recover digital representations of audio signals;

converting digital representations of audio signals to analog signals;

receiving an RTP control packet at a remote location coupled to the IP network; and, generating DTMF signals having characteristics determined by information contained in the RTP control packets.

19. An apparatus for removing DTMF signals from audio signals to be transmitted over an IP network, comprising:

a telephony interface;

a digital processor coupled to the telephony interface for processing digital representations of audio signals to detect potential DTMF signals;

a microcontroller coupled to the digital processor, the microcontroller being operative to prepare the digital representations of audio signals for transmission as RTP packets;

memory coupled to the microcontroller for temporarily storing RTP packets;

a control register coupled to the digital processor and readable by the microcontroller, the control register including a flag bit indicative of the status of detection of a potential DTMF signal, the control register including one or more flag bits indicative of the detection of a valid DTMF signal;

a network interface coupled to the microcontroller for coupling RTP packets to an IP network; and wherein when the flag bit indicative of the status of detection of a potential DTMF signal is not set, the RTP packets are promptly coupled to the network interface for transmission over the IP network, and when the flag bit indicative of the status of detection of a potential DTMF signal is set, the RTP packets are stored in the memory and transmission o stored RTP packets are stalled while the digital processor performs additional DTMF detection processing, and if the flag bit indicative of the status of detection of a potential DTMF signal is reset and a flag bit indicative of the detection of a valid DTMF signal is not set, the stored RTP packets are promptly coupled to the network interface for transmission over the IP network, and if a flag bit indicative of the detection of a valid DTMF signal is set, the stored RTP packets are discarded and a control packet is prepared by the microcontroller where the control packet contains information indicative of characteristics of a DTMF signal and the control packet is coupled to the network interface for transmission over the IP network.

20. The apparatus according to claim 19, further comprising:

a second network interface coupled to the IP network at a remote location;

a second microcontroller coupled to the second network interface;

a digital-to-analog converter coupled to the second microcontroller for converting digital representations of audio signals to analog signals; and, a DTMF signal generator coupled to the second microcontroller for generating DTMF signals having characteristics determined by information contained in a control packet.

21. The apparatus according to claim 19, further comprising:

a second network interface coupled to the IP network at a remote location;

a second microcontroller coupled to the second network interface;

a digital-to-analog converter coupled to the second microcontroller for converting digital representations of audio signals to analog signals; and, a second digital processor operative to generate DTMF signals having characteristics determined by information contained in a control packet.

22. A communication method for a transmission of an audio signal, said audio signal including a dual-tone multi-frequency (DTMF) signal having a first frequency tone and a second frequency tone, said communication method comprising:

sampling said audio signal to generate a plurality of samples;

digitizing said plurality of samples to generate a plurality of digitized samples;

detecting an energy indicative of said first frequency tone in said audio signal;

stalling said transmission of said digitized samples in response to said detecting said energy indicative of said first frequency tone in said audio signal;

determining whether said audio signal includes said DTMF signal in response to said detecting said energy indicative of said first frequency tone in said audio signal;

generating a packet indicative of said DTMF signal, discarding said digitized samples stalled by said stalling and transmitting said packet, in response to said determining that said audio signal includes said DTMF signal; and transmitting said digitized samples stalled by said stalling, in response to said determining that said audio signal does not include said DTMF signal.

23. The communication method of claim 22, wherein said first frequency is a high frequency and said second frequency is a low frequency.

24. The communication method of claim 22, wherein said detecting uses a wideband energy detector.

25. The communication method of claim 22, wherein said detecting compares said energy with a high threshold and a low threshold.

26. The communication method of claim 22, wherein said confirming confirms an existence of said first frequency and said second frequency in said audio signal.

27. The communication method of claim 22, wherein said confirming confirms a frequency tolerance of each said tone.

28. The communication method of claim 22, wherein said confirming confirms a frequency deviation of each said tone.

29. The communication method of claim 22, wherein said confirming confirms a twist in said audio signal.

30. A communication device for a transmission of an audio signal, said audio signal including a dual-tone multifrequency (DTMF) signal having a first frequency tone and a second frequency tone, said communication device comprising:
- a sampler capable of sampling said audio signal to generate a plurality of samples;
- a digitizer capable of digitizing said plurality of samples to generate a plurality of digitized samples;
- a detector capable of detecting an energy indicative of said first frequency tone in said audio signal; and
- a processor capable of stalling said transmission of said digitized samples and determining whether said audio signal includes said DTMF signal, in response to said detector detecting said energy indicative of said first frequency tone in said audio signal;
- wherein said processor is further capable of generating a packet indicative of said DTMF signal, discarding said digitized samples stalled by said stalling and transmitting said packet, in response to said determining that said audio signal includes said DTMF signal, and further capable of transmitting said digitized samples stalled by said stalling, in response to said determining that said audio signal does not include said DTMF signal.

31. The communication device of claim 30, wherein said first frequency is a high frequency and said second frequency is a low frequency.

32. The communication device of claim 30, wherein said detector is a wideband energy detector.

33. The communication device of claim 30, wherein said detector compares said energy with a high threshold and a low threshold.

34. The communication device of claim 30, wherein said processor confirms an existence of said first frequency and said second frequency in said audio signal.

35. The communication device of claim 30, wherein said processor confirms a frequency tolerance of each said tone.

36. The communication device of claim 30, wherein said processor confirms a frequency deviation of each said tone.

37. The communication device of claim 30, wherein said processor confirms a twist in said audio signal.

38. A communication method for a transmission of an audio signal, said audio signal including a dual-tone multi-frequency (DTMF) signal having a first frequency tone and a second frequency tone, said communication method comprising:
- analyzing said audio signal to detect an element indicative of said DTMF;
- stalling said transmission of said audio signal if said analyzing detects said element indicative of said DTMF, else continuing said transmission of said audio signal;
- processing said audio signal, in response to detecting said element indicative of said DTMF, to determine whether said audio signal includes said DTMF signal; and
- discarding said audio signal stalled by said stalling, generating a packet indicative of said DTMF signal and transmitting said packet if said processing determines said audio signal includes said DTMF signal, and transmitting said audio signal stalled by said stalling if said processing determines said audio signal does not include said DTMF signal.

39. The communication method of claim 38, wherein said element is an energy of said first frequency.

40. The communication method of claim 39, wherein said first frequency is a high frequency and said second frequency is a low frequency.

41. The communication method of claim 39, wherein said analyzing uses a wideband energy detector.

42. The communication method of claim 41, wherein said analyzing compares said energy with a high threshold and a low threshold.

43. The communication method of claim 38, wherein said processing is capable of confirming an existence of said first frequency and said second frequency in said audio signal.

44. The communication method of claim 38, wherein said processing is capable of confirming a frequency tolerance of each said tone.

45. The communication method of claim 38, wherein said processing is capable of confirming a frequency deviation of each said tone.

46. The communication method of claim 38, wherein said processing is capable of confirming a twist in said audio signal.

47. A communication device for a transmission of an audio signal, said audio signal including a dual-tone multi-frequency (DTMF) signal having a first frequency tone and a second frequency tone, said communication device comprising:
- a processor capable of analyzing said audio signal to detect an element indicative of said DTMF, wherein said processor stalls said transmission of said audio signal if said processor detects said element indicative of said DTMF, else said processor continues said transmission of said audio signal;
- wherein said processor processes said audio signal, in response to detecting said element indicative of said DTMF, to determine whether said audio signal includes said DTMF signal, and wherein said processor discards said stalled audio signal, generates a packet indicative of said DTMF signal and transmits said packet if said processor determines said audio signal includes said DTMF signal, and said processor transmits said stalled audio signal if said processor determines said audio signal does not include said DTMF signal.

48. The communication device of claim 47, wherein said element is an energy of said first frequency.

49. The communication device of claim 48, wherein said first frequency is a high frequency and said second frequency is a low frequency.

50. The communication device of claim 48, wherein said processor uses a wideband energy detector for analyzing said audio signal.

51. The communication device of claim 50, wherein said processor compares said energy with a high threshold and a low threshold for analyzing said audio signal.

52. The communication device of claim 47, wherein said processor is capable of confirming an existence of said first frequency and said second frequency in said audio signal.

53. The communication device of claim 47, wherein said processor is capable of confirming a frequency tolerance of each said tone.

54. The communication device of claim 47, wherein said processor is capable of confirming a frequency deviation of each said tone.

55. The communication device of claim 47, wherein said processor is capable of confirming a twist in said audio signal.

56. A communication method for a transmission of an audio signal, said audio signal including a dual-tone multi-frequency (DTMF) signal having a first frequency tone and a second frequency tone, said communication method comprising:
- detecting an element indicative of said DTMF;

stalling said transmission of said audio signal, in response to said detecting said element indicative of said DTMF;
determining whether said audio signal includes said DTMF signal, in response to said detecting said element indicative of said DTMF; and
discarding said audio signal stalled by said stalling, generating a packet indicative of said DTMF signal and transmitting said packet, in response to said determining that said audio signal includes said DTMF signal;
transmitting said audio signal stalled by said stalling, in response to said determining that said audio signal does not include said DTMF signal.

57. The communication method of claim 56, wherein said element is an energy of said first frequency.

58. The communication method of claim 57, wherein said detecting uses a wideband energy detector.

59. The communication method of claim 58, wherein said detecting compares said energy with a high threshold and a low threshold.

60. The communication method of claim 56, wherein said first frequency is a high frequency and said second frequency is a low frequency.

61. The communication method of claim 56, wherein said confirming confirms an existence of said first frequency and said second frequency in said audio signal.

62. The communication method of claim 56, wherein said confirming confirms a frequency tolerance of each said tone.

63. The communication method of claim 56, wherein said confirming confirms a frequency deviation of each said tone.

64. The communication method of claim 56, wherein said confirming confirms a twist in said audio signal.

65. A communication device for a transmission of an audio signal, said audio signal including a dual-tone multi-frequency (DTMF) signal having a first frequency tone and a second frequency tone, said communication device comprising:
means for detecting an element indicative of said DTMF;
means for stalling said transmission of said audio signal in response to said means for detecting said element indicative of said DTMF;
means for determining whether said audio signal includes said DTMF signal in response to said means for detecting said element indicative of said DTMF; and
means for discarding said audio signal stalled by said means for stalling, means for generating a packet indicative of said DTMF signal and means for transmitting said packet if said means for determining determines said audio signal includes said DTMF signal, and means for transmitting said audio signal stalled by said means for stalling if said means for determining determines said audio signal does not include said DTMF signal.

66. The communication device of claim 65, wherein said element is an energy of said first frequency.

67. The communication device of claim 66, wherein said means for detecting uses a wideband energy detector.

68. The communication device of claim 67, wherein said means for detecting compares said energy with a high threshold and a low threshold.

69. The communication device of claim 65, wherein said means for confirming confirms an existence of said first frequency and said second frequency in said audio signal.

70. A computer software product for a transmission of an audio signal, said audio signal including a dual-tone multi-frequency (DTMF) signal having a first frequency tone and a second frequency tone, said computer software product comprising:
code for detecting an element indicative of said DTMF;
code for stalling said transmission of said audio signal for execution in response to said code for detecting said element indicative of said DTMF;
code for determining whether said audio signal includes said DTMF signal in response to said code for detecting said element indicative of said DTMF;
code for discarding said audio signal stalled by said code for stalling, code for generating a packet indicative of said DTMF signal aid code for transmitting said packet for execution in response to said code for determining determine that said audio signal includes said DTMF signal; and
code for transmitting said audio signal stalled by said code for stalling if said determining determines that said audio signal does not include said DTMF signal.

71. The computer software product of claim 70, wherein said element is an energy of said first frequency.

72. The computer software product of claim 71, wherein said first frequency is a high frequency and said second frequency is a low frequency.

73. The computer software product of claim 71, wherein said code for detecting uses a wideband energy detector.

74. The computer software product of claim 73, wherein said code for detecting compares said energy with a high threshold and a low threshold.

75. The computer software product of claim 70, wherein said code for confirming confirms an existence of said first frequency and said second frequency in said audio signal.

76. A communication device for a transmission of an audio signal, said audio signal including a dual-tone multi-frequency (DTMF) signal having a first frequency tone and a second frequency tone, said communication device comprising:
a detector capable of detecting an element indicative of said DTMF; and
a processor capable of stalling said transmission of said audio signal and determining whether said audio signal includes said DTMF signal, in response to said detector detecting said element indicative of said DTMF;
wherein said processor is further capable of discarding said audio signal stalled by said processor, generating a packet indicative of said DTMF signal and transmitting said packet if said processor determines that said audio signal includes said DTMF signal, and further capable of transmitting said audio signal stalled by said processor if said processor determines that said audio signal does not include said DTMF signal.

77. The communication device of claim 76, wherein said element is an energy of said first frequency.

78. The communication device of claim 77, wherein said first frequency is a high frequency and said second frequency is a low frequency.

79. The communication device of claim 77, wherein said detector uses a wideband energy detector.

80. The communication device of claim 79, wherein said detector compares said energy with a high threshold and a low threshold.

81. The communication device of claim 76, wherein said processor confirms an existence of said first frequency and said second frequency in said audio signal.

* * * * *